US012747312B2

(12) United States Patent
Wang et al.

(10) Patent No.: US 12,747,312 B2
(45) Date of Patent: Sep. 29, 2026

(54) PREPARATION METHOD OF COMB-SHAPED POSITIVE ELECTRODE DISPERSING MATERIAL AND PREPARATION METHOD OF LOW-INTERNAL-RESISTANCE ELECTRODE PLATE

(71) Applicant: JIANGSU YITE NEW MATERIAL CO., LTD, Changzhou (CN)

(72) Inventors: Zhengzheng Wang, Changzhou (CN); Ruiwen Hao, Changzhou (CN); Wengang Qi, Changzhou (CN); Yuekai Geng, Changzhou (CN)

(73) Assignee: JIANGSU YITE NEW MATERIAL CO., LTD, Changzhou (CN)

( * ) Notice: Subject to any disclaimer, the term of this patent is extended or adjusted under 35 U.S.C. 154(b) by 149 days.

(21) Appl. No.: 18/427,886

(22) Filed: Jan. 31, 2024

(65) Prior Publication Data

US 2025/0034303 A1 Jan. 30, 2025

(30) Foreign Application Priority Data

Jul. 28, 2023 (CN) ........................ 202310934119.5

(51) Int. Cl.
*C08F 216/08* (2006.01)
*H01M 4/04* (2006.01)
(Continued)

(52) U.S. Cl.
CPC ....... *C08F 216/085* (2020.02); *H01M 4/0402* (2013.01); *H01M 4/1391* (2013.01); *H01M 4/5825* (2013.01); *H01M 4/62* (2013.01)

(58) Field of Classification Search
None
See application file for complete search history.

(56) References Cited

U.S. PATENT DOCUMENTS

2008/0300348 A1* 12/2008 Haddleton ............. A61K 47/58
524/378
2021/0179576 A1* 6/2021 Michaud ............. C07D 317/40

FOREIGN PATENT DOCUMENTS

CN 102585082 A 7/2012
CN 103084119 A 5/2013
(Continued)

OTHER PUBLICATIONS

CN103084119A—machine translation (Year: 2013).*

*Primary Examiner* — Haroon S. Sheikh

(57) ABSTRACT

The invention belongs to the technical field of battery dispersing materials, and discloses a preparation method of a comb-shaped positive electrode dispersing material, which comprises the following steps of: mixing a solvent, an unsaturated cyclic monomer, unsaturated branched polyether and a (methyl) acrylate monomer to obtain a mixed solution; heating the mixed solution to a reaction temperature, adding an initiating agent, and keeping the reaction temperature for reaction to obtain a semi-finished product; and adding phosphoric acid which is equal to the (methyl) acrylate monomer in mole into the semi-finished product for esterification and high-temperature dehydration to obtain the comb-shaped positive dispersing material. The invention further discloses a preparation method of a low-internal-resistance electrode plate by taking the comb-shaped positive electrode dispersion material as a raw material.

3 Claims, 1 Drawing Sheet

(51) Int. Cl.

| | |
|---|---|
| ***H01M 4/1391*** | (2010.01) |
| ***H01M 4/58*** | (2010.01) |
| ***H01M 4/62*** | (2006.01) |

(56) References Cited

FOREIGN PATENT DOCUMENTS

| | | |
|---|---|---|
| CN | 109817986 A | 5/2019 |
| CN | 112768692 A | 5/2021 |

* cited by examiner

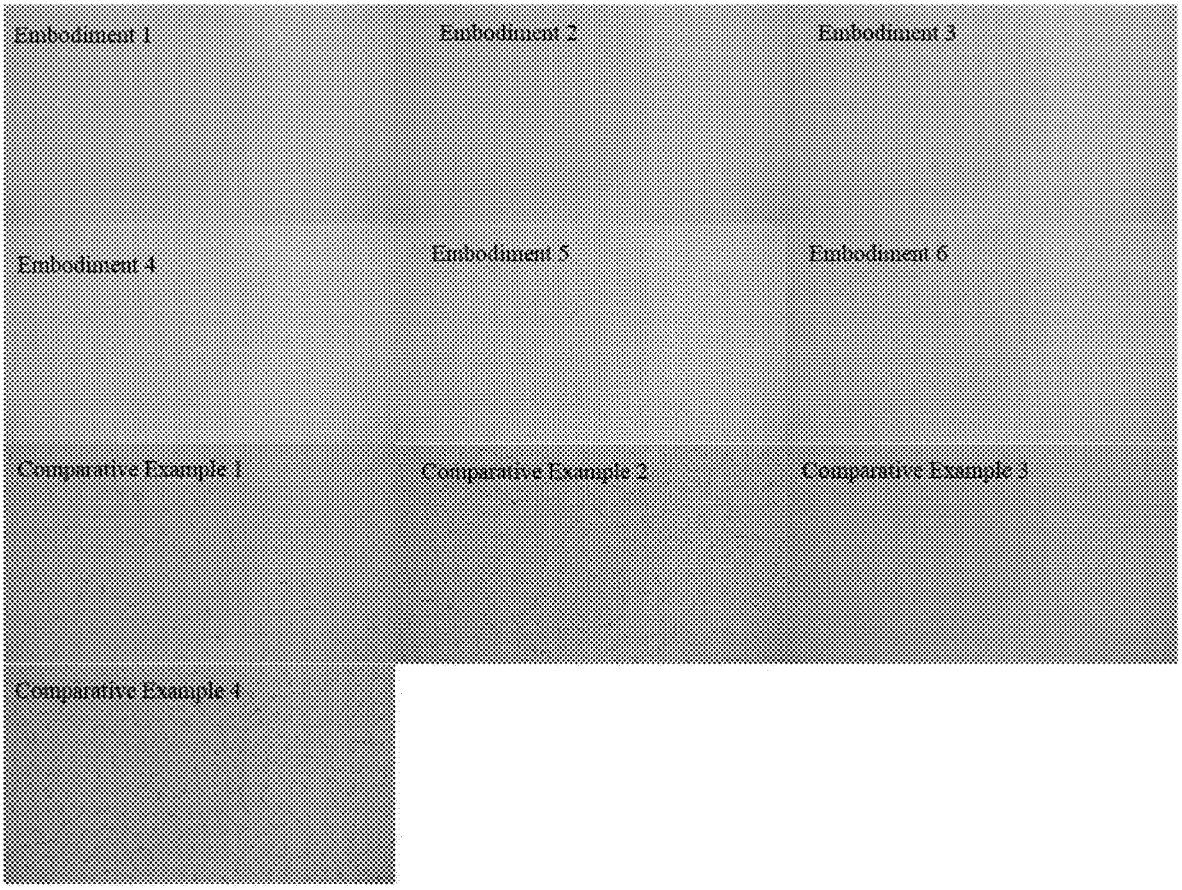
Embodiment 1
Embodiment 2
Embodiment 3
Embodiment 4
Embodiment 5
Embodiment 6
Comparative Example 1
Comparative Example 2
Comparative Example 3
Comparative Example 4

PREPARATION METHOD OF COMB-SHAPED POSITIVE ELECTRODE DISPERSING MATERIAL AND PREPARATION METHOD OF LOW-INTERNAL-RESISTANCE ELECTRODE PLATE

CROSS-REFERENCE TO RELATED APPLICATION

The present application claims priority from Chinese Patent Application No. 202310934119.5 filed on Jul. 28, 2023, the contents of which are incorporated herein by reference in their entirety.

TECHNICAL FIELD

The present invention belongs to the technical field of battery dispersing materials, and particularly relates to a preparation method of a comb-shaped positive electrode dispersing material and a preparation method of a low-internal-resistance electrode plate.

BACKGROUND

A lithium-ion battery is mainly composed of a positive electrode, a negative electrode, an electrolyte and a diaphragm, wherein the preparation of an electrode plate is a first step in a manufacturing process of the lithium-ion battery, and the quality of the electrode plate is related to a yield of the lithium-ion battery. The preparation of the electrode plate is divided into the steps of slurry stirring, electrode plate coating, rolling cutting and the like, and the slurry stirring is the key step. As for the electrode plate, a slurry is generally composed of a positive electrode material, a binder, a conductive agent, a solvent and the like. With increasing pressures in environmental protection, cost and other aspects, the market is now pursuing a slurry with a higher solid content to reduce the use of an NMP solvent, which also brings great difficulties to slurry dispersion and coating, and the introduction of a positive electrode dispersing material can effectively solve the above problems. However, there are a few of choices on the market at present, the industry has just started, and related patents are rarely disclosed. Moreover, the preparation of the electrode plate still has the problems of cracking, powder falling and uneven coating of the electrode plate at present, so that higher requirements for the positive electrode dispersing material are put forward. It is worth noting that the introduction of the dispersing material may have a negative impact on increase of internal resistance of the electrode plate, the internal resistance of the electrode plate is related to an energy density of the lithium-ion battery, and the relatively high internal resistance of the electrode plate can reduce the energy density, which is not conducive to the promotion and application of products. It is urgent to develop a novel positive electrode dispersing material, which can give consideration to both advantages of good dispersion effect and small internal resistance of the electrode plate.

Therefore, it is necessary to develop a preparation method of a comb-shaped positive electrode dispersing material and a preparation method of a low-internal-resistance electrode plate to solve the problems of a poor effect of the dispersing material and a high internal resistance of the electrode plate.

SUMMARY

The present invention aims to provide a preparation method of a comb-shaped positive electrode dispersing material and a preparation method of a low-internal-resistance electrode plate.

A technical solution of the present invention is as follows.

A preparation method of a comb-shaped positive electrode dispersing material comprises the following steps of:

(1) mixing a solvent, an unsaturated cyclic monomer, unsaturated branched polyether and a (methyl) acrylate monomer to obtain a mixed solution, wherein the solvent is any one or two of N-methylpyrrolidone and N-ethylpyrrolidone; the unsaturated cyclic monomer is any one or more of styrene, methylstyrene, vinylpyridine and N-vinylpyrrolidone; an initiator of the unsaturated branched polyether is any one of allyl alcohol, isobutylene alcohol and isopentenol, a participating chain segment of the unsaturated branched polyether is a copolymer of ethylene oxide and propylene oxide, a molecular weight of the unsaturated branched polyether ranges from 500 g/mol to 5000 g/mol, and the (meth) acrylate monomer is any one or more of hydroxyethyl methylacrylate, hydroxypropyl methacrylate, hydroxybutyl methacrylate, hydroxyethyl acrylate, hydroxypropyl acrylate and hydroxybutyl acrylate;

(2) heating the mixed solution to a reaction temperature, adding an initiating agent, and keeping the reaction temperature for reaction to obtain a semi-finished product; and (3) adding phosphoric acid which is equal to the (methyl) acrylate monomer in mole into the semi-finished product for esterification and high-temperature dehydration to obtain the comb-shaped positive dispersing material.

Further, in the step (1), a mass ratio of the unsaturated cyclic monomer to the unsaturated branched polyether and the (methyl) acrylate monomer is 2 to 4:4 to 7:1 to 2.

Further, in the step (2), the initiating agent is any one or more of azodiisobutyronitrile, azodiisoheptylnitrile and dibenzoyl peroxide; and according to a mass percentage, an amount of the initiating agent accounts for 0.1% to 3% of a sum of amounts of the unsaturated cyclic monomer, the unsaturated branched polyether and the (methyl) acrylate monomer.

Further, in the step (2), the reaction temperature is 60° C. to 90° C., and the reaction lasts for 2 hours to 10 hours.

Further, in the step (3), the esterification is carried out at a temperature of 70° C., and the esterification lasts for 3 hours to 6 hours.

Further, in the step (3), a molecular weight of the comb-shaped positive electrode dispersing material ranges from 10,000 g/mol to 60,000 g/mol.

Another technical solution of the present invention is as follows.

A preparation method of a low-internal-resistance electrode plate comprises the following steps of:

(1) uniformly mixing the comb-shaped positive electrode dispersing material, lithium iron phosphate, conductive carbon black, polyvinylidene fluoride and N-methylpyrrolidone, and dispersing the mixture by a vacuum defoamer to obtain a positive electrode slurry; and (2) pouring the positive electrode slurry on a spread plate machine for electrode plate coating to obtain the low-internal-resistance electrode plate.

Further, in the step (1), a mass ratio of the lithium iron phosphate to the conductive carbon black, the polyvinylidene fluoride, the N-methylpyrrolidone and the comb-shaped positive electrode dispersing material is 95:2:2:66:1.

Further, in the step (2), an areal density of the low-internal-resistance electrode plate ranges from 150 g/m$^2$ to 200 g/m$^2$.

The present invention provides the preparation method of the comb-shaped positive electrode dispersing material and the preparation method of the low-internal-resistance electrode plate, and has the beneficial effects as follows:

(1) the comb-shaped positive electrode dispersing material prepared by the method of the present invention has is simple in synthesis step and easy to operate, and is conductive to large-scale industrial production;

(2) the comb-shaped positive electrode dispersing material prepared by the method of the present invention is a comb-shaped macromolecule, a phosphate group on a main chain has a certain adsorption effect on positive electrode slurry particles, and a macromolecular polyether chain on a side chain may provide a strong steric hindrance effect, so that a dispersion effect is obviously better than that of an existing dispersing material;

(3) the comb-shaped positive electrode dispersing material prepared by the method of the present invention can increase a solid content of a lithium iron phosphate positive electrode slurry to 60 wt %, so that a viscosity of the material is greatly reduced compared with a blank sample, and viscosity stability of the material is ensured, and the viscosity is increased by about 10% after standing for 72 hours, which is conductive to a subsequent electrode plate coating process;

(4) the electrode plate prepared by the method of the present invention has a high coating yield, and the battery slurry with a lower viscosity and higher stability is easy to be coated at a high speed, so that coating efficiency can be improved, and the coated electrode plate is flat and smooth in surface and free of cracking and powder falling; and (5) compared with a contrast sample, the internal resistance of the electrode plate prepared by the method of the present invention is obviously reduced, because an excellent dispersion ability of the dispersing material enables conductive components and iron and lithium in the slurry to be uniformly dispersed, and the flat and smooth surface and no cracking of the electrode plate can also lead to further reduction of the internal resistance of the electrode plate, and the low internal-resistance electrode plate is conductive to improving an overall energy density of the battery.

BRIEF DESCRIPTION OF THE DRAWINGS

The sole FIGURE shows pictures of surfaces of electrode plates prepared in Embodiments 1 to 6 and Comparative Examples 1 to 4 by a preparation method of a low-internal-resistance electrode plate according to the present invention.

DETAILED DESCRIPTION

In order to give consideration to both advantages of good dispersion effect and small internal resistance of an electrode plate, the present invention provides a preparation method of a comb-shaped positive electrode dispersing material with high dispersion and a low internal resistance, which comprises the following steps.

In step 1), a solvent, an unsaturated cyclic monomer, unsaturated branched polyether and a (methyl) acrylate monomer are mixed to obtain a mixed solution.

In step 2), the mixed solution is heated to 60° C. to 90° C., an initiating agent is added, and a reaction temperature is kept for 2 hours to 10 hours to obtain a semi-finished product.

In step 3), phosphoric acid which is equal to the (methyl) acrylate monomer in mole is added into the semi-finished product for esterification at a temperature of 70° C. for 3 hours to 6 hours and high-temperature dehydration to obtain a final product, which is namely the comb-shaped positive dispersing material with a molecular weight ranging from 10,000 g/mol to 60,000 g/mol.

In the above process, the solvent may be any one or more of N-methylpyrrolidone, N-ethylpyrrolidone and the like, and preferably, the solvent is the N-methylpyrrolidone. By calculation by a mass percentage, there are 20% to 40% of unsaturated cyclic monomer, 40% to 70% of unsaturated branched polyether and 10% to 20% of (methyl) acrylate monomer, a total of which is 100%. The unsaturated cyclic monomer may be any one or more of styrene, methylstyrene, vinylpyridine and N-vinylpyrrolidone. An initiator of the unsaturated branched polyether is any one of allyl alcohol, isobutylene alcohol, isopentenol and the like, a participating chain segment of the unsaturated branched polyether is a copolymer of ethylene oxide and propylene oxide, which may be one or more of allylalcohol polyoxyethylene (300) polyoxypropylene (200) ether, allylalcohol polyoxyethylene (500) polyoxypropylene (500) ether, isobutylene polyoxyethylene (500) polyoxypropylene (1000) ether, isobutylene polyoxyethylene (1000) polyoxypropylene (1500) ether, isopentenyl polyoxyethylene (1500) polyoxypropylene (2000) ether and isopentenyl polyoxyethylene (2500) polyoxypropylene (2500) ether, and a molecular weight of the unsaturated branched polyether ranges from 500 g/mol to 5,000 g/mol. The (meth) acrylate monomer is any one or more of hydroxyethyl methylacrylate, hydroxypropyl methacrylate, hydroxybutyl methacrylate, hydroxyethyl acrylate, hydroxypropyl acrylate, hydroxybutyl acrylate and the like. The initiating agent is an oil-soluble initiating agent, which may be one or more of azodiisobutyronitrile, azodiisoheptylnitrile, dibenzoyl peroxide and the like, preferably, the initiating agent is the azodiisobutyronitrile, and an amount of the initiating agent is 0.1% to 3% of a mass of a polymerizable monomer (the unsaturated cyclic monomer, the unsaturated branched polyether and the (methyl) acrylate monomer).

By the above technical solution, the obtained dispersing material has a good performance, and a viscosity of a slurry system can be significantly reduced by adding the dispersing material into the positive electrode slurry. Moreover, the viscosity of the slurry can be kept stable for a long time, thus laying a good foundation for subsequent electrode plate coating. A preparation process of a low-internal-resistance electrode plate which is flat and smooth in surface and free of cracking is as follows.

Firstly, a positive electrode slurry is prepared: 95 parts of lithium iron phosphate ($LiFePO_4$), 2 parts of conductive carbon black, 2 parts of polyvinylidene fluoride, 66 parts of N-methylpyrrolidone and 1 part of positive electrode dispersing material are uniformly mixed, and dispersed by a vacuum defoamer to obtain the slurry; subsequently, the slurry is poured on a spread plate machine for electrode plate coating to obtain an electrode plate with an areal density of 150 g/m$^2$ to 200 g/m$^2$; and finally, a surface structure and an internal resistance of the electrode plate are tested. Thus, it can be known that the electrode plate is flat and smooth in surface, free of cracking and powder falling, and low in internal resistance.

In order to make the above objects, features and advantages of the present invention clearer and more understandable, technical solutions of the present invention are further described hereinafter with reference to embodiments. However, the present invention is not limited to the listed embodiments, but should also comprise any other commonly known changes within the scope of right claimed by the present invention.

"One embodiment" or "an embodiment" as used herein refers to a specific feature, structure or characteristic that can be included in at least one implementation of the present invention. "In one embodiment" appearing in different places in the specification do not all refer to the same embodiment, nor are they separate or selective embodiments mutually exclusive of other embodiments.

Embodiment 1

This embodiment showed a preparation method of a comb-shaped positive electrode dispersing material according to the following steps.

In step 1), 1,000 g of N-methylpyrrolidone, 200 g of styrene, 700 g of allylalcohol polyoxyethylene (300) polyoxypropylene (200) ether and 100 g of hydroxyethyl methylacrylate were mixed to obtain a uniform mixed solution.

In step 2), the mixed solution was heated to 90° C., 5 g of initiating agent was added, and a reaction temperature was kept for 2 hours to obtain a semi-finished product.

In step 3), 75 g of phosphoric acid was added into the semi-finished product for esterification and high-temperature dehydration at 70° C. for 3 hours to obtain a final product, which was namely the comb-shaped positive dispersing material.

A low-internal-resistance electrode plate which is flat and smooth in surface and free of cracking was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 150 $g/m^2$; and subsequently, a surface structure and an internal resistance of the electrode plate were tested.

Embodiment 2

This embodiment showed a preparation method of a comb-shaped positive electrode dispersing material according to the following steps.

In step 1), 1,000 g of N-methylpyrrolidone, 300 g of methylstyrene, 600 g of allylalcohol polyoxyethylene (500) polyoxypropylene (500) ether and 100 g of hydroxypropyl methacrylate were mixed to obtain a uniform mixed solution.

In step 2), the mixed solution was heated to 80° C., 15 g of initiating agent was added, and a reaction temperature was kept for 4 hours to obtain a semi-finished product.

In step 3), 68 g of phosphoric acid was added into the semi-finished product for esterification and high-temperature dehydration at 70° C. for 4 hours to obtain a final product, which was namely the comb-shaped positive dispersing material.

A low-internal-resistance electrode plate with a smooth and crack-free surface was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 160 $g/m^2$; and subsequently, a surface structure and an internal resistance of the electrode plate were tested.

Embodiment 3

This embodiment showed a preparation method of a comb-shaped positive electrode dispersing material according to the following steps.

In step 1), 1,000 g of N-methylpyrrolidone, 400 g of vinylpyridine, 500 g of isobutylene polyoxyethylene (500) polyoxypropylene (1000) ether and 100 g of hydroxybutyl methacrylate were mixed to obtain a uniform mixed solution.

In step 2), the mixed solution was heated to 80° C., 30 g of initiating agent was added, and a reaction temperature was kept for 10 hours to obtain a semi-finished product.

In step 3), 62 g of phosphoric acid was added into the semi-finished product for esterification and high-temperature dehydration at 70° C. for 5 hours to obtain a final product, which was namely the comb-shaped positive dispersing material.

A low-internal-resistance electrode plate with a smooth and crack-free surface was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 170 $g/m^2$; and subsequently, a surface structure and an internal resistance of the electrode plate were tested.

Embodiment 4

This embodiment showed a preparation method of a comb-shaped positive electrode dispersing material according to the following steps.

In step 1), 1,000 g of N-methylpyrrolidone, 400 g of N-vinylpyrrolidone, 400 g of isobutylene polyoxyethylene (1000) polyoxypropylene (1500) ether and 200 g of hydroxyethyl acrylate were mixed to obtain a uniform mixed solution.

In step 2), the mixed solution was heated to 70° C., 15 g of initiating agent was added, and a reaction temperature was kept for 8 hours to obtain a semi-finished product.

In step 3), 169 g of phosphoric acid was added into the semi-finished product for esterification and high-temperature dehydration at 70° C. for 6 hours to obtain a final product, which was namely the comb-shaped positive dispersing material.

A low-internal-resistance electrode plate which is flat and smooth in surface and free of cracking was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 180 $g/m^2$; and subsequently, a surface structure and an internal resistance of the electrode plate were tested.

Embodiment 5

This embodiment showed a preparation method of a comb-shaped positive electrode dispersing material according to the following steps.

In step 1), 1,000 g of N-methylpyrrolidone, 300 g of styrene, isopentenyl polyoxyethylene (1500) polyoxypropylene (2000) ether and 200 g of hydroxypropyl acrylate were mixed to obtain a uniform mixed solution.

In step 2), the mixed solution was heated to 80° C., 5 g of initiating agent was added, and a reaction temperature was kept for 6 hours to obtain a semi-finished product.

In step 3), 151 g of phosphoric acid was added into the semi-finished product for esterification and high-temperature dehydration at 70° C. for 4 hours to obtain a final product, which was namely the comb-shaped positive dispersing material.

A low-internal-resistance electrode plate which is flat and smooth in surface and free of cracking was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 190 $g/m^2$; and subsequently, a surface structure and an internal resistance of the electrode plate were tested.

Embodiment 6

This embodiment showed a preparation method of a comb-shaped positive electrode dispersing material according to the following steps.

In step 1), 1,000 g of N-methylpyrrolidone, 200 g of N-vinylpyrrolidone, 600 g of isopentenyl polyoxyethylene (2500) polyoxypropylene (2500) ether and 200 g of hydroxybutyl acrylate were mixed to obtain a uniform mixed solution.

In step 2), the mixed solution was heated to 90° C., 1 g of initiating agent was added, and a reaction temperature was kept for 4 hours to obtain a semi-finished product.

In step 3), 136 g of phosphoric acid was added into the obtained semi-finished product for esterification and high-temperature dehydration at 70° C. for 6 hours to obtain a final product, which was namely the comb-shaped positive dispersing material.

A low-internal-resistance electrode plate which is flat and smooth in surface and free of cracking was prepared from the above comb-shaped positive dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone and 1 part of comb-shaped positive dispersing material were uniformly mixed, and fully dispersed for 4 hours by a vacuum defoamer; subsequently, the dispersed slurry was poured on a spread plate machine for electrode plate coating to obtain an electrode plate with an areal density of 200 $g/m^2$; and subsequently, a surface structure and an internal resistance of the electrode plate were tested.

Comparative Example 1

A preparation method of a positive electrode dispersing material comprised the following steps.

In step 1), 1,000 g of N-methylpyrrolidone, 500 g of styrene and 500 g of hydroxyethyl methylacrylate were mixed to obtain a uniform mixed solution.

In step 2), the mixed solution was heated to 90° C., 5 g of initiating agent was added, and a reaction temperature was kept for 2 hours.

In step 3), 377 g of phosphoric acid was added into the obtained semi-finished product for esterification and high-temperature dehydration at 70° C. for 3 hours to obtain a final product, which was namely a positive electrode slurry dispersing material of a battery.

An electrode plate was prepared from the above dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone, 1 part of positive electrode slurry dispersing material of the battery and the like were uniformly mixed, and fully dispersed for 4 hours by a vacuum defoamer; subsequently, the dispersed slurry was poured on a spread plate machine for electrode plate coating to obtain an electrode plate with an areal density of 150 $g/m^2$; and finally, a surface structure and an internal resistance of the electrode plate were tested.

Comparative Example 2

A preparation method of a positive electrode dispersing material comprised the following steps.

In step 1), 1,000 g of N-methylpyrrolidone and 1,000 g of polyethylene glycol (300) propylene glycol (200) methacrylate were mixed to obtain a uniform mixed solution.

In step 2), the mixed solution was heated to 90° C., 5 g of initiating agent was added, and a reaction temperature was kept for 2 hours to obtain a product, which was a positive electrode slurry dispersing material of a battery.

An electrode plate was prepared from the above dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone, 1 part of positive electrode slurry dispersing material of the battery and the like were uniformly mixed, and fully dispersed for 4 hours by a vacuum defoamer; subsequently, the dispersed slurry was poured on a spread plate machine for electrode plate coating to obtain an electrode plate with an areal density of 150 $g/m^2$; and subsequently, a surface structure and an internal resistance of the electrode plate were tested.

Comparative Example 3

A preparation method of a positive electrode dispersing material comprised the following steps.

In step 1), 1,000 g of N-methylpyrrolidone, 300 g of styrene and 700 g of allylalcohol polyoxyethylene (300) polyoxypropylene (200) ether were mixed to obtain a uniform mixed solution.

In step 2), the mixed solution was heated to 90° C., 5 g of initiating agent was added, and a reaction temperature was kept for 2 hours to obtain a product, which was a positive electrode slurry dispersing material of a battery.

An electrode plate was prepared from the above dispersing material, and a preparation process was as follows: firstly, a positive electrode slurry was prepared: 95 parts of lithium iron phosphate ($LiFePO_4$), 2 parts of conductive carbon black, 2 parts of polyvinylidene fluoride, 66 parts of N-methylpyrrolidone, 1 part of positive electrode slurry dispersing material of the battery and the like were uniformly mixed, and fully dispersed for 4 hours by a vacuum defoamer; subsequently, the dispersed slurry was poured on a spread plate machine for electrode plate coating to obtain an electrode plate with an areal density of 150 $g/m^2$; and subsequently, a surface structure and an internal resistance of the electrode plate were tested.

Comparative Example 4

A universal-type commercially available dispersing material is provided and used for dispersion of a positive electrode slurry and preparation and characterization of a positive electrode plate.

An electrode plate was prepared from the above commercially available dispersing material, and a preparation process was as follows.

Firstly, the positive electrode slurry was prepared: 95 parts of lithium iron phosphate ($LiFePO_4$), 2 parts of conductive carbon black, 2 parts of polyvinylidene fluoride, 66 parts of N-methylpyrrolidone, 1 part of commercially available dispersing material and the like were uniformly mixed, and fully dispersed for 4 hours by a vacuum defoamer; subsequently, the dispersed slurry was poured on a spread plate machine for electrode plate coating to obtain an electrode plate with an areal density of 150 g/ma; and subsequently, a surface structure and an internal resistance of the electrode plate were tested.

Related tests on a molecular weight of the dispersing material, a viscosity of the positive electrode slurry, internal resistance of the positive electrode plate and a surface state of the electrode plate were as follows.

TABLE 1

| Sample | Molecular weight of dispersing material (g/mol) | Solid content (wt %) | Initial viscosity (mPa · s) | 72-hour biscosity (mPa · s) |
|---|---|---|---|---|
| Embodiment 1 | 32456 | 60 | 9450 | 10480 |
| Embodiment 2 | 15871 | 61 | 9550 | 10455 |
| Embodiment 3 | 10351 | 59 | 8955 | 9852 |
| Embodiment 4 | 25831 | 58 | 9250 | 10175 |
| Embodiment 5 | 45865 | 61 | 9756 | 10731 |
| Embodiment 6 | 59855 | 59 | 9350 | 10275 |
| Comparative Example 1 | 21345 | 58 | 16850 | 20246 |
| Comparative Example 2 | 27683 | 57 | 17520 | 21900 |
| Comparative Example 3 | 32816 | 59 | 14550 | 17485 |
| Comparative Example 4 | 21348 | 58 | 15808 | 19760 |

Firstly, the molecular weight of the dispersing material, the viscosity of the positive electrode slurry and the like were tested. With reference to Table 1, Table 1 is a test table of the molecular weights of the dispersing materials and the viscosities of the positive electrode slurries. Results in Table 1 show that a dispersing material with an expected molecular weight is obtained. By comparing the initial viscosities and the 72-hour viscosities of the slurries in the embodiments and the comparative examples, it can be concluded that the embodiments have a good dispersion effect and dispersion retention capacity, while the comparative examples generally have a high initial viscosity and a poor 72-hour viscosity. By comparing the embodiments with Comparative Example 1 and Comparative Example 2, it can be seen that the synthesized comb-shaped macromolecular structure is necessary, and copolymerization of unsaturated heterocyclic monomer alone or unsaturated polyether alone has no obvious viscosity reduction effect. By comparing the embodiments with Comparative Example 3, it can be seen that existence of phosphate is also conductive to viscosity reduction and viscosity maintenance of the slurry. By comparing the embodiments with Comparative Example 4, it can be seen that the viscosities of the slurries in the embodiments are obviously better than that of the commercially available dispersing material.

Secondly, surface states of the positive electrode plates obtained in Embodiments 1 to 6 and Comparative Examples 1 to 4 are observed by a microscope and photographed, so as to compare a difference between the samples. With reference to the sole FIGURE, the sole FIGURE shows pictures of surfaces of the electrode plates prepared in Embodiments 1 to 6 and Comparative Examples 1 to 4 by the preparation method of the low-internal-resistance electrode plate according to the present invention. As shown in the sole FIGURE, the surfaces of the positive electrode plates in Embodiments 1 to 6 involved in the present invention are flat and smooth in surface and free of cracking and powder falling, while the surfaces of the positive electrode plates in Comparative Examples 1 to 4 have more or less cracking or surface non-uniformity.

Finally, the internal resistances of the positive electrode plates are tested, and the internal resistances of the positive electrode plates in Embodiments 1 to 6 and Comparative Examples 1 to 4 are compared. With reference to Table 2, Table 2 is a test table of the internal resistances of the electrode plates in Embodiments 1 to 6 and Comparative Examples 1 to 4. It can be seen from Table 2 that the internal resistances of the electrode plates in Embodiments 1 to 6 are obviously lower than those in Comparative Examples 1 to 4, so that the advantage of low internal resistance is achieved. By comparing the embodiments with Comparative examples 1 to 2, it can be seen that the comb-shaped macromolecular structure is necessary, and a polyether monomer alone or copolymerization of heterocyclic monomer alone has no internal resistance reduction effect. By comparing the embodiments with Comparative Example 3, it can be seen that phosphate also has the internal resistance reduction effect. By comparing the embodiments with Comparative Example 4, it can be seen that the internal resistance reduction effects in the embodiments involved in the present invention are obviously better than that of the commercially available dispersing material.

TABLE 2

| Sample | Areal density of electrode plate ($g/m^2$) | Internal resistance of electrode plate (mΩ) |
|---|---|---|
| Embodiment 1 | 150 | 540 |
| Embodiment 2 | 160 | 525 |
| Embodiment 3 | 170 | 495 |
| Embodiment 4 | 180 | 516 |
| Embodiment 5 | 190 | 538 |
| Embodiment 6 | 200 | 519 |
| Comparative Example 1 | 150 | 635 |
| Comparative Example 2 | 150 | 755 |
| Comparative Example 3 | 150 | 695 |
| Comparative Example 4 | 150 | 720 |

It should be noted that, the embodiments above are only used to illustrate the technical solutions of the present invention, and are not intended to limit the present invention. Although the present invention is described in detail with reference to the preferred embodiments, those of ordinary skills in the art should understand that modifications or equivalent replacements made on the technical solutions of the present invention without deviating from the spirit and scope of the technical solutions of the present invention should be included within the scope of the claims of the present invention.

What is claimed is:

1. A preparation method of a comb-shaped positive electrode dispersing material, comprising the following steps of:

(1) mixing a solvent, an unsaturated cyclic monomer, unsaturated branched polyether and a (methyl) acrylate monomer to obtain a mixed solution, wherein the solvent is any one or two of N-methylpyrrolidone and N-ethylpyrrolidone;

the unsaturated cyclic monomer is any one or more of styrene, methylstyrene, vinylpyridine and N-vinylpyrrolidone;

the unsaturated branched polyether is a starting material prepared by the alkoxylation of a hydroxyl-functional unsaturated starter selected from the group consisting of allyl alcohol, isobutylene alcohol, and isopentenol, the unsaturated branched polyether comprises a polyoxyalkylene chain segment formed by copolymerization of ethylene oxide and propylene oxide monomers onto the starter material, a molecular weight of the unsaturated branched polyether ranges from 500 g/mol to 5,000 g/mol, and the (methyl) acrylate monomer is any one or more of hydroxyethyl methylacrylate, hydroxypropyl methacrylate, hydroxybutyl methacrylate, hydroxyethyl acrylate, hydroxypropyl acrylate and hydroxybutyl acrylate;

(2) heating the mixed solution to a reaction temperature, adding an initiating agent to initiate a reaction, and keeping the reaction temperature for the reaction to obtain a semi-finished product; and (3) adding phosphoric acid which is equal to the (methyl) acrylate monomer in mole into the semi-finished product for esterification and high-temperature dehydration to obtain the comb-shaped positive dispersing material, wherein, in the step (1), a mass ratio of the unsaturated cyclic monomer to the unsaturated branched polyether and the (methyl) acrylate monomer is 2 to 4:4 to 7:1 to 2, in the step (2), the initiating agent is any one or more of azodiisobutyronitrile, azodiisoheptylnitrile and dibenzoyl peroxide; and according to a mass percentage, an amount of the initiating agent accounts for 0.1% to 3% of a sum of amounts of the unsaturated cyclic monomer, the unsaturated branched polyether and the (methyl) acrylate monomer, and in the step (3), a molecular weight of the comb-shaped positive electrode dispersing material ranges from 10,000 g/mol to 60,000 g/mol.

2. The preparation method of the comb-shaped positive electrode dispersing material according to claim 1, wherein, in the step (2), the reaction temperature is 60° C. to 90° C., and the reaction lasts for 2 hours to 10 hours.

3. The preparation method of the comb-shaped positive electrode dispersing material according to claim 1, wherein, in the step (3), the esterification is carried out at a temperature of 70° C., and the esterification lasts for 3 hours to 6 hours.

* * * * *